(12) United States Patent
Faes et al.

(10) Patent No.: US 8,672,787 B2
(45) Date of Patent: Mar. 18, 2014

(54) DRIVE BELT

(75) Inventors: Paulus Adrianus Josephus Maria Faes, Tilburg (NL); Antonius Embregt Van Hout, Geldrop (NL)

(73) Assignee: Robert Bosch GmbH, Stuttgart (DE)

( * ) Notice: Subject to any disclaimer, the term of this patent is extended or adjusted under 35 U.S.C. 154(b) by 274 days.

(21) Appl. No.: 13/140,701

(22) PCT Filed: Dec. 19, 2008

(86) PCT No.: PCT/NL2008/050818
§ 371 (c)(1),
(2), (4) Date: Jul. 20, 2011

(87) PCT Pub. No.: WO2010/071406
PCT Pub. Date: Jun. 24, 2010

(65) Prior Publication Data
US 2012/0021859 A1   Jan. 26, 2012

(51) Int. Cl.
*F16G 5/16*   (2006.01)

(52) U.S. Cl.
USPC .......................................................... 474/240

(58) Field of Classification Search
USPC .......................................... 474/240, 242, 201
See application file for complete search history.

(56) References Cited

U.S. PATENT DOCUMENTS

| | | | | |
|---|---|---|---|---|
| 4,494,946 A * | 1/1985 | Wilcox | ......................... | 474/242 |
| 4,826,473 A * | 5/1989 | Miyawaki | ....................... | 474/240 |
| 4,894,049 A * | 1/1990 | Koppelaars | .................... | 474/240 |
| 5,374,223 A * | 12/1994 | Hendriks | ...................... | 474/242 |
| 6,074,317 A * | 6/2000 | Kobayashi | .................... | 474/201 |
| 6,409,620 B1 * | 6/2002 | Yoshida et al. | ................ | 474/242 |
| 6,565,469 B1 * | 5/2003 | Aoyama et al. | ................ | 474/242 |
| 7,108,624 B2 * | 9/2006 | Smeets et al. | .................. | 474/201 |
| 7,846,049 B2 * | 12/2010 | Kanehara et al. | .............. | 474/201 |
| 7,963,873 B2 * | 6/2011 | Kobayashi | ...................... | 474/242 |
| 8,100,797 B2 * | 1/2012 | Prinsen | .......................... | 474/242 |
| 2001/0051554 A1 | 12/2001 | Kanehara et al. | | |

FOREIGN PATENT DOCUMENTS

| | | |
|---|---|---|
| EP | 1 178 240 A2 | 2/2002 |
| EP | 1 219 860 A1 | 7/2002 |
| JP | 63/266247 A | 11/1988 |
| JP | 2000 130516 A | 5/2000 |
| JP | 2004 225787 A | 8/2004 |
| JP | 2005 249023 A | 9/2005 |
| WO | 98/04847 A1 | 2/1998 |
| WO | 2007/004858 A1 | 1/2007 |
| WO | 2007/013797 A1 | 2/2007 |
| WO | 2010/034320 A2 | 4/2010 |

OTHER PUBLICATIONS

International Search Report, dated Sep. 15, 2009, from corresponding PCT application.

* cited by examiner

*Primary Examiner* — William A Rivera
*Assistant Examiner* — Michael Riegelman
(74) *Attorney, Agent, or Firm* — Young & Thompson

(57) ABSTRACT

Drive belt (3) including several hundred transverse elements (20) provided on and in sliding relationship with an endless carrier (10) and having a head part (21) that is bent such that it protrudes in longitudinal direction relative to a body part (23) of the elements (20). On average between the transverse elements (20) of the drive belt (3), the longitudinal protrusion LP of the head parts (21) thereof combines to between 4 and 40 times an amount of play present in longitudinal direction between the transverse elements (20) of the drive belt (3) when placed in a circular posture at the radial position of the rocking edges (25).

14 Claims, 4 Drawing Sheets

DRIVE BELT

BACKGROUND OF THE INVENTION

1. Field of the Invention

The present invention relates to a drive belt.

2. Description of the Related Art

Drive belts of the present type are generally known through their application in continuously variable transmissions intended for the transmission of mechanical power at a continuously variable speed and torque ratio between an engine and a load in particular for automotive purposes. Such transmission and drive belt are, for instance, described in the European patent application EP-A-1219860.

The known drive belt generally comprises an endless carrier and an array of several hundred, correspondingly shaped transverse elements, each having a longitudinally facing front and rear main surfaces, which elements are essentially oriented in parallel in the drive belt such that the front main face of the elements each face the rear main face of an respectively adjacent element and vice versa. The carrier is provided in a slot of the elements such that the elements may freely slide over the carrier in the direction of movement, i.e. longitudinal direction thereof.

The belt's transverse elements are each provided with a so-called rocking edge on the front main face, which rocking edge forms the transition between a bottom section of the element having a longitudinal dimension or thickness that reduces in radially inward direction and a top section of the element having a thickness that is more or less constant, at least in comparison. The transverse elements each further include an at least generally trapezoid-shaped lower or body part that is located below the carrier receiving slot, an at least generally arrow-head shaped upper or head part and a central or pillar part placed between and interconnecting said head and body parts. Usually, the said rocking edge is provided in the said body part, i.e. radially inward form the carrier receiving slot, which body part is further provided with laterally facing side or contact surfaces, one on either side thereof, for arriving into a frictional contact with pulleys of the transmission during operation thereof.

In the continuously variable transmission the drive belt rotationally connects two pulleys, each having two essentially conically shaped pulley discs that define a V-groove of variable width, where between a longitudinally curved section of the drive belt is located. The posture of the drive belt in such transmission thus includes two longitudinally straight trajectory parts where it crosses from one pulley to the other and two longitudinally bent trajectory parts where it runs between and in frictional contact with the discs of a pulley at a respective radius of curvature for each of said two pulleys, which radii define the geometric transmission ratio of the transmission. In the said bent trajectory parts adjacent transverse elements mutually contact through their respective rocking edges.

The pulley discs exert a clamping force on the transverse elements of the drive belt, which force, on the one hand, enables torque transmission through friction between the respective pulley and the drive belt and, on the other hand, urges the transverse elements radially outward with respect to the axis of rotation of the respective pulley. The actual radial movement of the transverse elements is, however, limited by the carrier, so that (a radial component of) the clamping force is transmitted by the transverse elements to the carrier via a normal force there between. The carrier is thereby put under tension enabling torque transmission from a driving pulley to a driven pulley by means of the transverse elements pushing each other forward from the driving to the driven pulley along the circumference of the carrier, while being supported and guided thereby. On the other, so-called slack side of the drive belt, the transverse elements are returned from the driven pulley back to the driving pulley, however at a much lower, possibly even zero, pushing force existing there between.

It is common practice that the combined thickness of the transverse elements of the drive belt is slightly smaller than the circumference of the carrier, such that a gap exists in longitudinal direction between at least two adjacent, i.e. not physically abutting transverse elements, a/o for allowing the drive belt to be assembled without difficulty. This gap is denoted the belt's longitudinal play or clearance, which is defined and may be measured by placing the belt in a circular posture and sliding two adjacent transverse elements thereof apart, i.e. in mutually opposite longitudinal directions along the circumference of the carrier, until all of the transverse elements of the belt are mutually abutting through their respective rocking edges, thus forming a continuous array. The gap thus formed between the said two adjacent, but slid apart transverse elements defines the so-called initial static clearance that is to be measured at the radial position of the rocking edge. Hereby, it is remarked that during operation in the transmission the actual static or actual dynamic play in longitudinal direction, i.e. clearance, between the elements varies in dependency on the actual posture of the drive belt, i.e. on the geometric transmission ratio, as well as on the load applied thereto. Moreover, the belt's longitudinal clearance tends to increase over time, due to wear of the transverse elements during operation of the transmission. Indeed, it has been found by applicant that by the end of the service life of the drive belt, the ultimate dynamic clearance typically can amount up to ten times the said initial static clearance.

Although it greatly facilitates drive belt assembly, it has also been recognized in the art that longitudinal belt clearance has an adverse effect on transmission efficiency and/or wear, which may be understood as follows. When entering the driving pulley the transverse elements may have to overcome some resistance before they are taken up by the said pulley, in which case the elements have to be actively pushed between the discs the driving pulley to a certain extend, due to the interplay of forces in the transmission. To overcome this entry resistance at least some compressive force has to be build-up between the transverse elements in the slack straight return part of the drive belt's trajectory, whereby an array or string of mutually abutting elements will be formed in this trajectory part too. Moreover, once such transverse elements arrive into frictional contact with the driving pulley they are accelerated forward by the rotation thereof. By these two effects the dynamic clearance tends to be present at least in part in a first or entry part of the belt's longitudinally bent trajectory on the driving pulley. This means that only a part of this bent trajectory is available for the build-up of a pushing force between the elements, which latter, second part is denoted the active part of this bent trajectory wherein the elements are mutually abutting. In such active part the transverse elements are slipping backwards relative to the rotation of the driving pulley, whereby the clearance between adjacent elements present in the entry part is removed. However, by such slipping, wear occurs and energy is dissipated and transmission efficiency is adversely affected.

SUMMARY OF THE INVENTION

It is an object of the invention to improve the efficiency of and/or reduce wear in the transmission and, more in particular, to mitigate the above-mentioned adverse effects of the longitudinal belt clearance. Obviously, such object could in principle be realized by reducing the amount of static clearance, which has already been suggested in art as represented by, for example, the patent publications JP-A-63/266247, WO-A-98/04847 and EP-A-1178240, which latter document suggests to incorporate in the drive belt two or even three types of transverse elements, each type having a different thickness, so-called standard and adjusting type elements. However, in practice these known solutions may suffer from a more difficult manufacturing and assembly process, i.e. their realization requires additional effort and cost.

According to the present invention, the object may alternatively be realized by applying the drive belt, favourably without placing a special requirement on the amount of longitudinal belt clearance.

According to the invention the head part of at least a part of the transverse elements is bent in the longitudinal direction, preferably by the axial sides of the head part being displaced relative to the central part thereof that is connected to the element's neck part. By applying the claimed measure it is effected that in the straight return trajectory part of the drive belt, i.e. where the transverse element are transported from the driven pulley back to the driving pulley, adjacent transverse elements are mutually contacting through their head parts, which form the effectively thickest part of the elements. As a result, the said longitudinal belt clearance at the level or radial position of the rocking edge of the transverse elements will be accommodated in the said straight return trajectory part.

It is noted that it is an essential feature of the invention that the amount of bending of the head part of the transverse elements differs between the elements, i.e. shows a distribution, since otherwise the head parts of adjacent elements would mutually nest, essential without having an effect on the longitudinal dimension or effective thickness of the transverse elements. Further, it is noted that the said bending of the head parts of the transverse elements will be gradually removed by the elastic deformation thereof, as the pushing force between abutting elements increases, and will thus normally only be present in the said slack side of the drive belt, where it crosses over from the driven to the driving pulley. Finally, it is noted that the said bending of the head parts can easily be combined with other measures for reducing or accommodating the said belt clearance, such as are known from the above-mentioned patent publications and/or from the unpublished International patent application Nr. PCT/EP2007/064528.

The amount of bending of the head part relative to the body part of the transverse elements is defined and distributed between the respective elements such that at least the initial static clearance is removed by the elements in the straight return trajectory part. Since the length of the return trajectory part typically amounts to slightly less than one quarter of the total belt circumference length, as is derived in detail in EP-A-1219860, the number of transverse elements present in such trajectory part can be approximated on the safe-side by the following equation (1):

$$Ne = \frac{L}{4 \cdot Dr}, \qquad (1)$$

wherein:
Ne represents the approximate number of transverse elements in the straight return trajectory part of the drive belt, L is the belt's circumference length at the level of the rocking edges and wherein
Dr is the thickness of the belt's transverse elements at the rocking edge thereof.

This number of elements Ne is thus available to accommodate the initial static clearance in accordance with the present invention, such that the following equation (2) can be derived:

$$\Delta D = \frac{Csi}{Ne} = \frac{4 \cdot Dr \cdot Csi}{L}, \qquad (2)$$

wherein:
Csi is the initial static clearance incorporated in the drive belt and wherein
$\Delta D$ is a distance in longitudinal, i.e. transverse element thickness direction that is on average per element to be accommodated by the feature of the bent head part distribution, i.e. the average thickness increase.

Preferably, also the ultimate dynamic clearance is at least partly accommodated in the same manner, whereto $\Delta D$ should be greater than the value calculated by equation 2. In this respect, the complete accommodation of the said ultimate dynamic clearance of course represents a purposeful upper limit for the said average thickness increase $\Delta D$. Based on the above observation that the ultimate dynamic clearance typically can amount up to ten times the said initial static clearance the following range may thus arrived at for the average thickness increase $\Delta D$:

$$\frac{4 \cdot Dr \cdot Csi}{L} \leq \Delta D \leq \frac{40 \cdot Dr \cdot Csi}{L}. \qquad (3)$$

According to the invention, the said feature of the bent head part can be favourably realized both by (slightly) rotating the head part relative to the body part of the transverse element, thus twisting the element's neck part.

BRIEF DESCRIPTION OF THE DRAWING FIGURES

The invention is illustrated in the accompanying drawings, in which.

Figure 1:
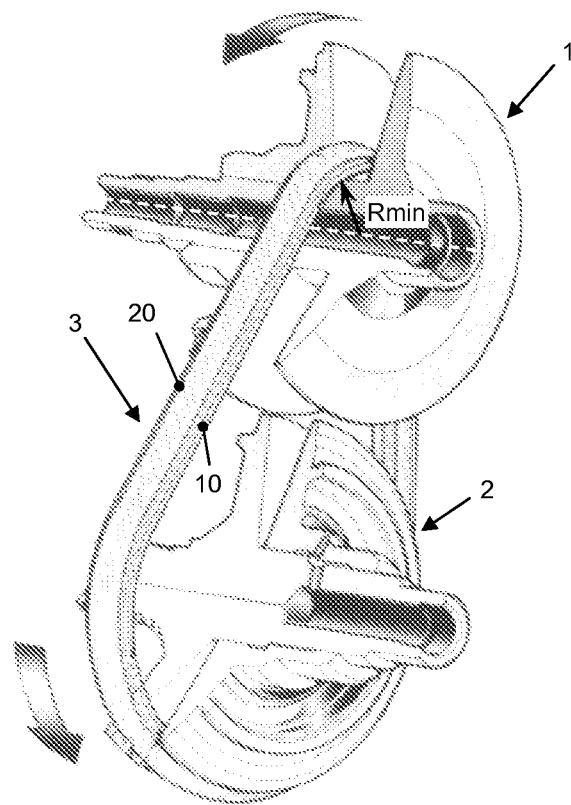
FIG. 1 is a schematic depiction drawn in perspective of a transmission wherein the drive belt according to the invention is used.
Figure 3:
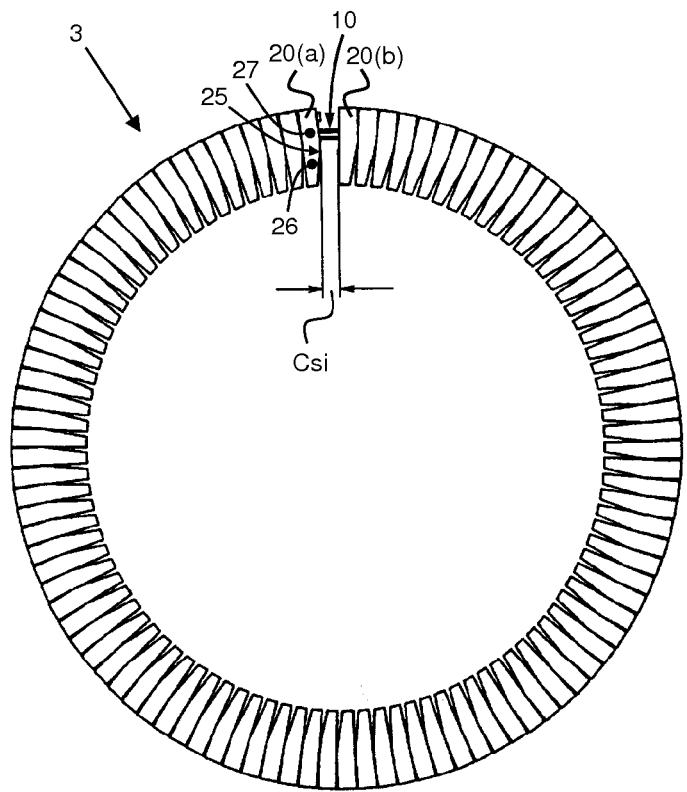
Figure 4:
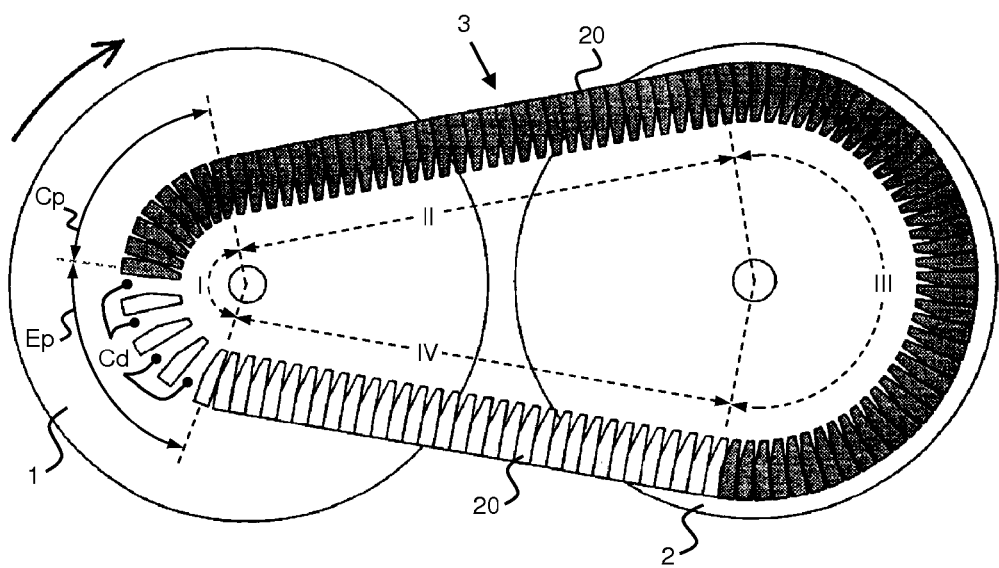
Figure 5:
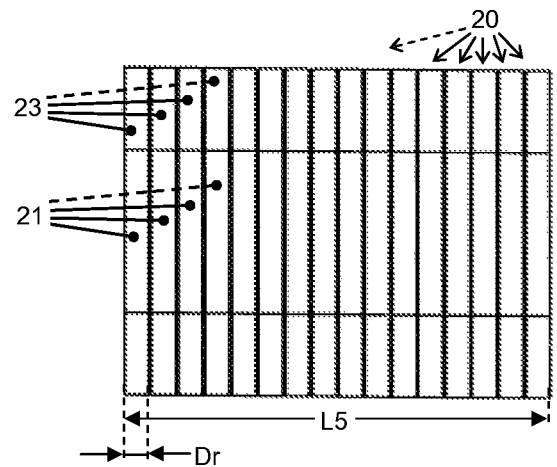
Figure 6:
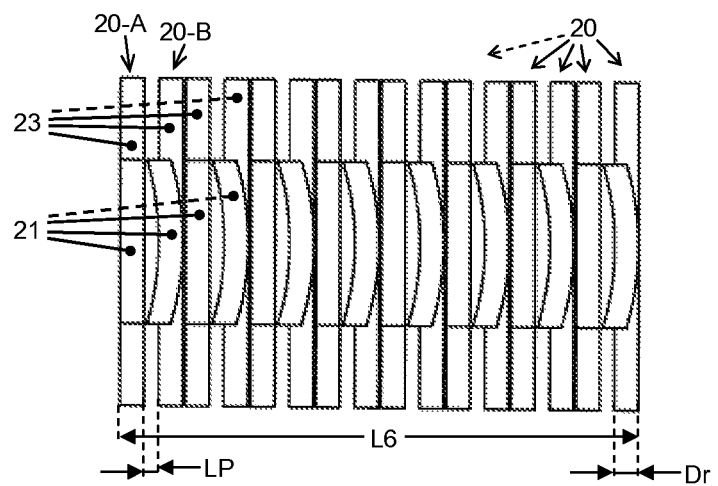
Figure 7:
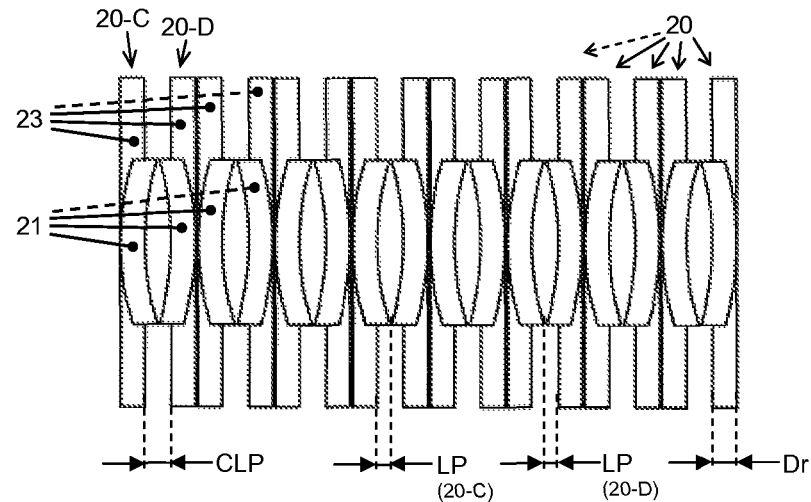
Figure 8:
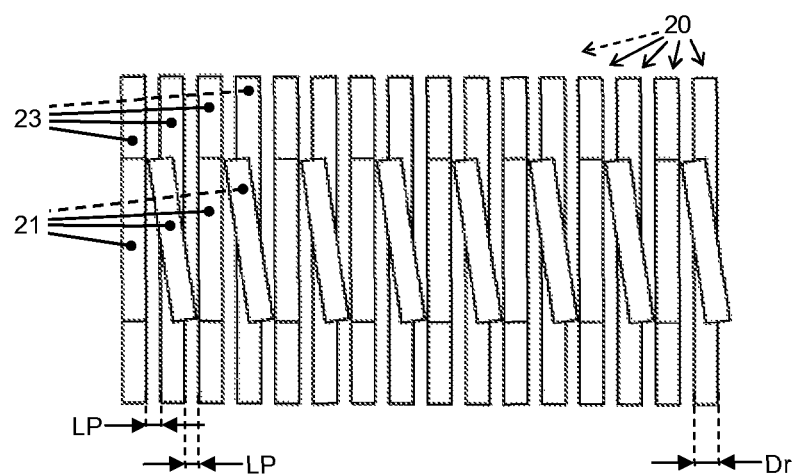

FIG. 3 schematically indicates the feature of the belt's initial static clearance;

FIG. 4 is a schematic depiction of a cross-section of the FIG. 1 transmission in operation, indicating the feature of dynamic clearance;

FIG. 5 is a schematic top elevation of an array of conventionally shaped transverse elements;

FIG. 6 is a top elevation of an array of transverse elements shaped in accordance with a first embodiment of the invention;

FIG. 7 is a top elevation of an array of transverse elements shaped in accordance with a second embodiment of the invention; and FIG. 8 is a top elevation of an array of transverse elements shaped in accordance with a third embodiment of the invention.

DETAILED DESCRIPTION OF THE INVENTION

FIG. 1 is a schematic depiction drawn in perspective of a transmission wherein the drive belt 3 according to the invention is used, which comprises a number of transverse elements 20 that are made from plate material and that are mounted on an endless carrier 10, such that these elements 20 can slide along the carrier 10 along its longitudinal direction. The transmission comprises two pulleys 1 and 2 that each define a tapered groove of variable width, wherein a longitudinally bent part of a drive belt 3 is mounted. In the figure the drive belt 3 is the most tightly bent in the first or driving pulley 1 that during operation is connected to and will be driven by an engine or motor (not shown). In between the pulleys 1 and 2 the drive belt 3 follows an essentially straight trajectory. This type of transmission and its operation are well known in the art.

Figure 2:
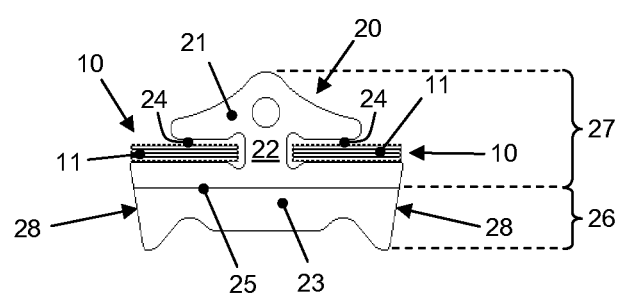
FIG. 2 is a cross-section of the drive belt.

FIG. 2 is a cross-section of the drive belt 3 as seen in longitudinal direction. The figure shows a front elevation of a transverse element 20, and a cross-section of the carrier 10, which in this embodiment of the drive belt 3 is shown to comprise two parts that each comprise a number of mutually "nested", i.e. radially stacked, continuous bands 11 mounted in a respective recess or slot 24 in the element 20. Each such slot 24 is provided on and opens towards a lateral side of the element 20 in-between a generally trapezoid-shaped lower or body part 23 and a generally arrow-head shaped upper or head part 21 of the element 20. These upper and lower parts 21, 23 are interconnected via a central pillar part 22 of the element 20. In the body part 23 there is provided a so-called rocking edge 25 that forms the transition between a bottom section 26 of the element 20 having a longitudinal dimension or thickness that reduces in radially inward direction and a top section 27 of the element 20 having a thickness that is, at least in comparison, relatively constant. The elements 20 arrive into contact with the pulleys 1 and 2 during operation of the transmission through lateral contact surfaces 28.

FIG. 3 provides a schematic side elevation of the drive belt 3 placed in a circular posture and illustrates the feature of the belt's longitudinal clearance. Such longitudinal belt clearance is defined as the width of a gap or longitudinal play that exists between the two adjacent transverse elements 20(a) and 20(b) at the radial position of the rocking edge 25, when all of the transverse elements 20 of the drive belt 3 are mutually abutting. When measured in a new drive belt 3 that is circularly arranged, i.e. with the transverse elements 20 placed in a continuous, essentially circular array as indicated in FIG. 3, the clearance is called the initial static clearance Csi. A certain amount of initial static clearance Csi is normally provided to allow the drive belt 3 to be assembled without difficulty. The longitudinal belt clearance may also result from wear of, in particular, the transverse elements 20, which causes a minimally, however notional increase of the longitudinal belt clearance over the service life of the drive belt 3. Moreover, the longitudinal belt clearance that occurs dynamically, i.e. during operation varies in dependency on the load applied to the drive belt 3, as well as the exact posture of the drive belt 3 in the transmission, i.e. on the radii of the bent trajectory parts thereof. By the end of the service life of the drive belt 3 such dynamic clearance Cd (as indicated in FIG. 4) ultimately amounts to in the order of ten times the said initial static clearance Csi.

FIG. 4 provides a simplified axial cross-section the transmission of FIG. 1, indicating the four main trajectory parts of the drive belt 3, i.e. a longitudinally bent part I at the location of the driving pulley 1, a taut straight part II, wherein the transverse elements 20 of the drive belt 3 are transported from the driving pulley 1 to the driven pulley 2, a further longitudinally bent part III at the location of the driven pulley 2 and a slack straight or return part IV, wherein the elements 20 are returned from the driven pulley 2 to the driving pulley 1.

Hereby, the curved arrow at the driving pulley 1 indicates the direction of rotation thereof. The transverse elements 20 that are shaded in gray are subjected to a relatively high push force during operation of the transmission, which force effectively pushes the elements from the driving pulley 1 to driven pulley 2, whereas between the other elements 20 of the drive belt 3 that are returning from the driven pulley 2 to the drive pulley 1 relatively little force is exerted.

Still, because of pulley deformation during operation the transverse elements 20 experience a resistance when entering the driving pulley 1, i.e. arrive into frictional contact with the discs thereof. To overcome this entry resistance at least some compressive force has to be build-up between the transverse elements 20 at this location in this slack straight part IV of the drive belt's trajectory, whereby an array or string of mutually abutting elements 20 is also formed in this trajectory part IV. As a result hereof, the dynamic clearance Cd tends to accumulate between the transverse elements 20 that are located in a first or entry part Ep of the longitudinally bent trajectory part I on the driving pulley 1, which phenomenon is illustrated in FIG. 4.

This above means that relatively few transverse elements 20 are available on the driving pulley 1 for the build-up of the push force in the drive belt 3, which elements 20 form the so-called compression part Cp of the longitudinally bent trajectory part I on the driving pulley 1. The dynamic clearance Cd that still exists between the elements 20 in the entry part Ep is removed by the elements 20 in the compression part Cp slipping backwards relative to the rotational movement of the driving pulley 1. Apart from adversely affecting the transmission efficiency, this phenomenon also causes the clamping force applied by the discs of the driving pulley 1 onto the elements 20 to be relatively and disadvantageously high, since only this latter part Cp is available for force transfer between driving pulley 1 and drive belt 3.

It would thus be advantageous to limit the longitudinal play, i.e. gaps between the elements 20 that is/are present in the entry part Ep on the driving pulley 1, and preferably to eliminate the occurrence of such play or gaps altogether. According to the invention, such may be realized by increasing the thickness of the transverse elements 20, at least effectively or apparently in the longitudinal direction of the drive belt 3 in the said slack straight trajectory part IV thereof, by bending the head part 21 of at least a part of the transverse elements in the longitudinal direction.

In FIG. 5 an ultimately schematic top elevation of an array of sixteen, mutually abutting and conventionally shaped transverse elements 20 is shown. The length L5 of the said array, i.e. the combined longitudinal thickness of the sixteen transverse elements 20 amounts to 16 times the plate thickness Dr of an individual element 20. The length of the array of transverse elements 20 can be increased to L6 by bending the head parts 21 of at least a part of the respective elements 20 in the longitudinal direction and/or by bending the head parts 21 of the respective elements 20 to a varying extent in the longitudinal direction. A first embodiment of the invention is schematically illustrated in FIG. 6 in a top elevation of the said array.

In FIG. 6 two types 20-A, 20-B of transverse elements 20 are alternately included in the said array, whereof a first type 20-A is shaped conventionally, i.e. with essentially flat head and body parts 21, 23, and whereof a second type 20-B is provided with a bent head part 21 that protrudes in longitudinal direction relative to the body part 23 thereof. In this example, the bending of the head part 21 of the second type 20-B of transverse elements 20 is realized by displacing both axial ends/sides thereof in a corresponding longitudinal direction relative to a central part of the head part that is connected to the element's neck part 22. As a result, the transverse elements 20 are provided with an effective or apparent (i.e. on average in the said array) thickness that is increased relative to the said plate thickness Dr by half the amount of longitudinal protrusion LP of the head part 21 of the second type 20-B of transverse element 20 relative to the body part 23 thereof. In other words, the combined longitudinal thickness of the sixteen transverse elements 20 of FIG. 6, amounts to 16 times the said plate thickness Dr plus 8 times the said amount of longitudinal protrusion LP (i.e. L6=L5+ 8*LP).

By applying the transverse element design of FIG. 6 it is realized that in the slack straight trajectory part IV of the drive belt 3, i.e. where the transverse elements 20 are transported from the driven pulley 2 back to the driving pulley 1, adjacent transverse elements 20 are mutually contacting through their respective head parts 21. Hereby, a small gap or play may be present between the body parts 23 of every other pair of adjacent transverse elements 20, e.g. at the radial position of the respective rocking edges 25 thereof, which gap is determined by the said amount of longitudinal protrusion LP and which gap accommodates a (small) part of the belt's total longitudinal clearance.

According to the invention, the amount of longitudinal protrusion LP is defined such that in total, i.e. when combined over all pairs of adjacent elements 20 in the slack straight trajectory part IV, the gaps formed there between can amount to at least the initial static clearance Csi. Preferably, however, also the said initial dynamic or even the said ultimate dynamic clearance Cd, can be accommodated in the slack straight trajectory part IV of the drive belt 3. It being noted that in the respective other parts I, II, III of the drive belt's trajectory, the head parts 21 of the transverse elements 20 are flattened, i.e. the said bending thereof is largely, if not completely, removed, due to the pushing force exerted between the elements 20 in these other parts I, II, III.

Thus, during operation of the transmission according to the present invention, at least the initial static clearance Csi will be automatically accommodated, at least in part, in the said slack straight trajectory part IV, such that the amount or part of the dynamic clearance Cd that may still be present in the said entry part Ep during operation is substantially and favourably reduced. By this measure, the transverse elements 20 will slip considerably less relative to the pulley discs of the driving pulley 1 and the transmission efficiency is improved as a consequence. Moreover, wear in the frictional contact between the drive belt 3 and the pulleys 1, 2 can also be favourably reduced. Alternatively, the invention allows for a comparatively large initial clearance Csi to be incorporated in the drive belt 3, i.e. favourably allows for the drive belt 3 to be assembled from transverse elements 20 of identical plate thickness Dr, i.e. all made from the same (base) plate material.

In this first embodiment of the invention presented in FIG. 6, the above-mentioned distance ΔD in transverse element thickness direction that is on average per element 20 accommodated by the feature of the bent head part 21 thus amounts to half the said longitudinal protrusion LP of the head part 21. Accordingly, the following equation (4) should be satisfied by the drive belt 3 according to the present invention:

$$LP > 2 \cdot \frac{4 \cdot Dr \cdot Csi}{L}. \quad (4)$$

For example, in a state of the art design of the drive belt 3 for automotive application, the transverse elements 20 are provided with a plate thickness Dr between 1 to 2 mm, the initial static clearance Csi can amount up to 2 mm, i.e. essentially the thickness of 1 element, at a drive belt length between 600 mm to 750 mm, the minimally required longitudinal protrusion LP of the head part 21 is typically in the order of 20 μm (microns) up to 50 μm. Further, taken into account that the ultimate dynamic clearance typically amounts up to 3 mm, or ten times the amount of initial static clearance that is typically incorporated in a drive belt 3, it follows that the maximally required longitudinal protrusion LP of the head part 21 may range up to 80 microns. Generally speaking, the longitudinal protrusion LP of the head part 21 of the transverse elements will have a value in the range between 10 and 100 microns, preferably between 20 and 80 microns. Thus depending on the specific design of the transmission and/or of the drive belt design applied therein, the said ultimate dynamic clearance Cd can potentially even be removed completely from the said entry part Ep by applying the measure defined by the present invention to the appropriate extend.

Of course the above equation (4) is only valid if the said two types 20-A, 20-B of transverse elements 20 are alternately included in the drive belt 3. If the drive belt 3 is to be assembled from transverse elements 20 that are randomly selected from the said two types 20-A and 20-B thereof, as may be favoured per se for simplifying the drive belt assembly process, the minimally required longitudinal protrusion LP of the head part 21 of the second type 20-B of transverse elements 20 increases considerably. In this latter case, the initial static clearance Csi of the thus assembled drive belt 3 is accommodated in the said slack straight trajectory part IV when the following equation (5) is satisfied:

$$LP > 4 \cdot \frac{4 \cdot Dr \cdot Csi}{L}. \quad (5)$$

Naturally, also other defined combinations of bent and flat transverse elements 20, i.e. with regular and repeating patterns, are possible within the framework of the invention, as may, for instance, be desired to control the stiffness in longitudinal direction of the array of elements. Also the amount and even the direction of bending may vary between the transverse elements 20 of the drive belt 3. In this latter respect, FIG. 7 schematically illustrates a second embodiment of the invention is, again in a top elevation of an array of transverse elements 20.

In FIG. 7 too, two types 20-C, 20-D of transverse elements 20 are alternately included in the said array, whereof the second type 20-D corresponds with the second type 20-B of element 20 of the said first embodiment. In this case, however, the first type 20-C of transverse element 20 is likewise provided with a bent head part 21, albeit bent in the opposite longitudinal direction. As a result, the transverse elements 20 are provided with an effective or apparent (i.e. on average in the said array) thickness that is increased relative to the said plate thickness Dr by half the combined amount of longitudinal protrusion CLP provided by the latter two types 20-C, 20-D of transverse element 20.

This second embodiment has the advantage that the amount of (one-sided) longitudinal protrusion LP minimally required for each type 20-C, 20-D of mirror image-like shaped transverse element 20 (as depicted in FIG. 7) corresponds to only half the required longitudinal protrusion LP in the said first embodiment. I.e. the above equation (3) is directly valid for this second embodiment of the invention. In case of random selection of the transverse elements 20 from such two types 20-C, 20-D of mirror image-like shaped elements 20, the above equation (4) holds.

In FIG. 8 a third embodiment of the invention is schematically illustrated, again in a top elevation of an array of transverse elements 20. In this third embodiment the head part 21 of every other transverse element 20 in the array of elements 20 is rotated to relative to the body parts 23 thereof, whereto the respective neck parts 22 (see FIG. 2) have been twisted. This third embodiment has the same advantage over the first embodiment as the second embodiment, namely that the increase in effective thickness of the transverse elements 20 relative to the said plate thickness Dr thereof is doubled. In this case, simply because the head part 21 protrudes relative to the respective body part 23 in either longitudinal direction, i.e. in FIG. 8 both towards the left and towards the right, or in forward and in backward direction relative to the array of transverse elements 20. Thus in this case too, the above equation (3) is directly valid in relation to the one-sided amount of longitudinal protrusion LP defined by transverse elements 20 with the bent, i.e. rotated, head part 21. In case of random selection of the transverse elements 20 from such-like bent and flat transverse elements 20, the above equation (4) holds. In practice it may also be opted to produce the transverse elements 20 with three or more types of transverse elements 20, each type with a different amount and/or direction of bending of the head part 21.

In this latter respect, it is noted that even for a single type of transverse elements 20 the amount of bending normally will be subject to a tolerance around a nominal or mean value "μ", as allowed in element production. For reasons of cost and/or manufacturing efficiency, a continuously varying amount of bending of the head part 21, i.e. of longitudinal protrusion LP thereof, may thus be favoured in each of the above described embodiments, simply by allowing a wide tolerance for such parameter in manufacturing, i.e. wide in relation to the typical tolerance band with a standard deviation "σ" of less than 10 microns. In this case, the longitudinal protrusion LP will typically be normally or Gaussianly distributed, such that the required amount of longitudinal protrusion LP depends on the said allowed tolerance; a wider tolerance requiring a smaller longitudinal protrusion LP and vice versa. For example, it can be determined that by providing the head parts 21 of all of the transverse elements 20 of the drive belt 3 with a longitudinal protrusion LP relative to the body parts 23 thereof that is Gaussianly distributed around one single nominal or mean value of 0.050 mm with a standard deviation of 0.015 mm, around 0.9 mm of longitudinal belt clearance will be accommodated in a belt's straight return trajectory part that is incorporates 100 individual elements 20. Of course such amount of 0.9 mm will only be realised on average between a large number of drive belts 3, i.e. will itself show a distribution, or, in this example, about 0.6 mm of longitudinal belt clearance is thus accommodated in an individual belt 3 with virtual (>99.99%) certainty.

It is noted that, generically speaking, the feature of the head part 21 of the transverse element 20 of the drive belt 3 being bent in longitudinal direction is as such known in the art. For example in the Japanese patent application published as JP-A-2005-249023 a similarly shaped element is shown, albeit for an entirely different reason and intended effect. The present invention thus specifically concerns the numeric limitation of the feature of the bent head part 1 that is purposively linked to the presently intended effect of removing at least the said initial static incorporated in the drive belt 3 and/or the actual static, the actual dynamic or the ultimate dynamic clearance, as set out in detail in the above.

The invention claimed is:
1. A drive belt (3) for a continuously variable transmission, comprising:
   an array of several hundred transverse elements (20) provided on and in sliding relationship with an endless carrier (10) of the belt (3);
   a head part (21) of each transverse element (20), each head part being located radially outward from the carrier (10);
   a body part (23) that is located radially inward from the carrier; and
   a neck part (22) that is provided between the head part and the body part,
   an axially oriented rocking edge (25) being defined in the body part (23), radially outward wherefrom the body part (23) is provided with an essentially constant dimension Dr in a longitudinal direction of the belt (3), that is a thickness Dr, and radially inward wherefrom the thickness of the body part (23) decreases, and the head parts (21) of a part or of all of the transverse elements (20) of the drive belt (3) being bent in said longitudinal direction relative to the respective body parts (23) thereof, whereby gaps (LP; CLP) are formed between at least some of the body parts (23) of adjacent transverse elements (20) when the adjacent transverse elements are contacting through their head parts (23) in a straightened section of the drive belt (3),
   wherein a design of the drive belt (3) satisfies the equation:

$$\frac{4 \cdot Dr \cdot Csi}{L} \leq \Delta D \leq \frac{40 \cdot Dr \cdot Csi}{L},$$

where Csi is an amount of play initially present in longitudinal direction between the transverse elements (20) of the drive belt (3) when placed in a circular posture at the radial position of the rocking edges (25),
   L is a circumference length, i.e. total dimension in longitudinal direction, of the drive belt (3) at the radial position of rocking edges (25) of the transverse elements (20) thereof, and
   ΔD is the size in longitudinal direction of the said gaps (LP; CLP) when averaged between all of the transverse elements (20) of the drive belt (3).

2. The drive belt according to claim 1, wherein the bent head parts (21) protrude in longitudinal direction relative to the respective body parts (23) over a distance of between 10 and 100 microns.

3. The drive belt (3) according to claim 1, wherein at least one of the transverse elements (20) of the drive belt (3) is provided with a head part (21) having axial side parts that are longitudinally displaced relative to a central part thereof, which central part is connected to the neck part (22) of the respective transverse element (20).

4. The drive belt (3) according to claim 1, wherein at least one of the transverse elements (20) of the drive belt (3) is provided with a twisted neck part (22).

5. The drive belt (3) according to claim 1, wherein the belt (3) is provided with a defined number of types (20-A, 20-B; 20-C, 20-D) of transverse element (20), each such type (20-A, 20-B; 20-C, 20-D) providing a different amount of bending of the head part (21) relative to the body part (23) that is essentially the same for all of the transverse elements (20) of a respective type (20-A, 20-B; 20-C, 20-D), i.e. lie within a narrow tolerance band of e.g. 5 microns around a mean value.

6. The drive belt (3) according to claim 5, wherein the belt (3) is provided with two of the types (20-A, 20-B; 20-C, 20-D) of transverse element (20).

7. The drive belt (3) according to claim 5, wherein the types (20-A, 20-B; 20-C, 20-D) of transverse element (20) are randomly incorporated in the drive belt (3).

8. The drive belt (3) according to claim 5, wherein the types (20-A, 20-B; 20-C, 20-D) of transverse element (20) are incorporated in the drive belt (3) in a regular and repeating pattern, or alternatingly.

9. The drive belt (3) according to claim 1, wherein the bent head parts (21) protrude in longitudinal direction relative to the respective body parts (23) over a distance of between 20 and 80 microns.

10. The drive belt (3) according to claim 1, wherein the bent head parts (21) protrude in longitudinal direction relative to the respective body parts (23) over a distance of around 50 microns.

11. A drive belt (3) for a continuously variable transmission, comprising:
   an array of several hundred transverse elements (20) provided on and in sliding relationship with an endless carrier (10) of the belt (3);
   a head part (21) of each transverse element (20), each head part being located radially outward from the carrier (10);
   a body part (23) that is located radially inward from the carrier; and
   a neck part (22) that is provided between the head part and the body part, at least one of the transverse elements (20) of the drive belt (3) being provided with a twisted neck part (22),
   an axially oriented rocking edge (25) being defined in the body part (23), radially outward wherefrom the body part (23) is provided with an essentially constant dimension Dr in a longitudinal direction of the belt (3), that is a thickness Dr, and radially inward wherefrom the thickness of the body part (23) decreases, and the head parts (21) of a part or of all of the transverse elements (20) of the drive belt (3) being bent in said longitudinal direction relative to the respective body parts (23) thereof, whereby gaps (LP; CLP) are formed between at least some of the body parts (23) of adjacent transverse elements (20) when the adjacent transverse elements are contacting through their head parts (23) in a straightened section of the drive belt (3),
   wherein a design of the drive belt (3) satisfies the equation:

$$\frac{4 \cdot Dr \cdot Csi}{L} \leq \Delta D \leq \frac{40 \cdot Dr \cdot Csi}{L},$$

where Csi is an amount of play initially present in longitudinal direction between the transverse elements (20) of the drive belt (3) when placed in a circular posture at the radial position of the rocking edges (25),
   L is a circumference length, i.e. total dimension in longitudinal direction, of the drive belt (3) at the radial position of rocking edges (25) of the transverse elements (20) thereof, and
   $\Delta D$ is the size in longitudinal direction of the said gaps (LP; CLP) when averaged between all of the transverse elements (20) of the drive belt (3).

12. The drive belt (3) according to claim 11, wherein the bent head parts (21) protrude in longitudinal direction relative to the respective body parts (23) over a distance of between 10 and 100 microns.

13. The drive belt (3) according to claim 11, wherein the bent head parts (21) protrude in longitudinal direction relative to the respective body parts (23) over a distance of between 20 and 80 microns.

14. The drive belt (3) according to claim 11, wherein the bent head parts (21) protrude in longitudinal direction relative to the respective body parts (23) over a distance of around 50 microns.

\* \* \* \* \*

UNITED STATES PATENT AND TRADEMARK OFFICE
CERTIFICATE OF CORRECTION

PATENT NO. : 8,672,787 B2  Page 1 of 1
APPLICATION NO. : 13/140701
DATED : March 18, 2014
INVENTOR(S) : Faes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 305 days.

Signed and Sealed this
Twenty-ninth Day of September, 2015

Michelle K. Lee
*Director of the United States Patent and Trademark Office*